L. C. BAYLES.
PERCUSSIVE TOOL.
APPLICATION FILED MAR. 28, 1912.
1,138,179.
Patented May 4, 1915.
2 SHEETS—SHEET 1.
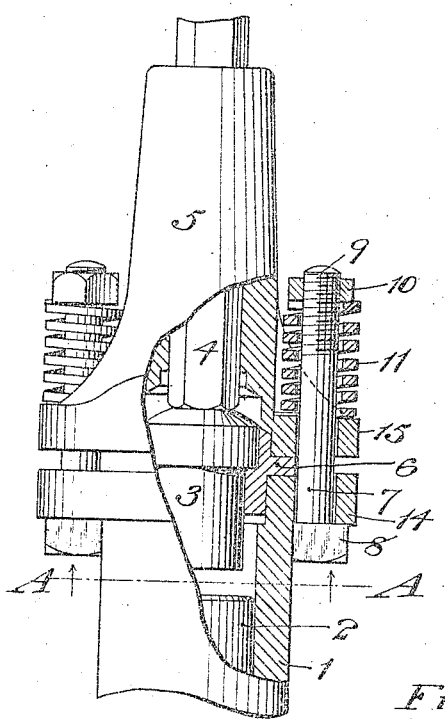
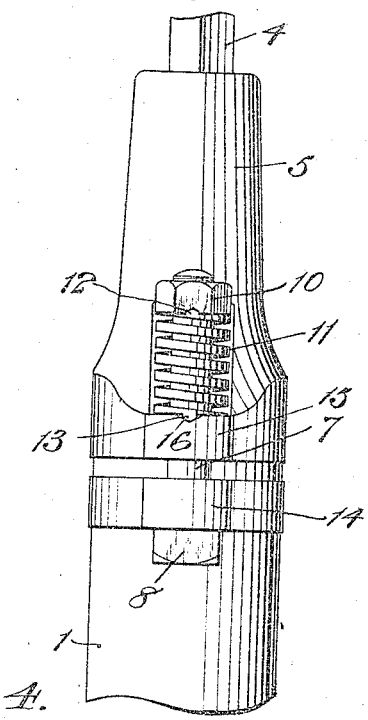
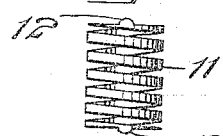
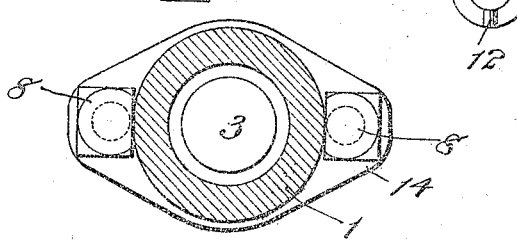
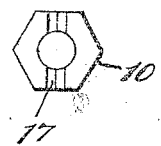

L. C. BAYLES.
PERCUSSIVE TOOL.
APPLICATION FILED MAR. 28, 1912.
1,138,179.
Patented May 4, 1915.
2 SHEETS—SHEET 2.
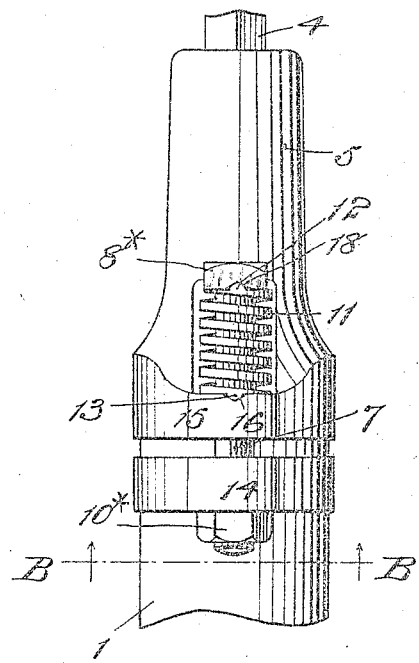
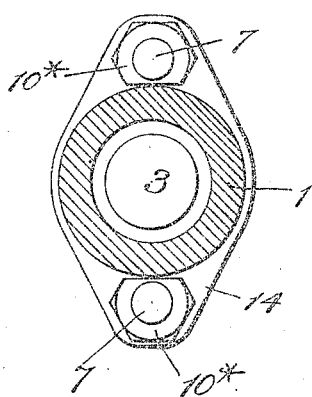

UNITED STATES PATENT OFFICE.

LEWIS C. BAYLES, OF EASTON, PENNSYLVANIA, ASSIGNOR TO INGERSOLL-RAND COMPANY, OF NEW YORK, N. Y., A CORPORATION OF NEW JERSEY.

PERCUSSIVE TOOL.

1,138,179.

Specification of Letters Patent. Patented May 4, 1915.

Application filed March 28, 1912. Serial No. 666,838.

*To all whom it may concern:*

Be it known that I, LEWIS C. BAYLES, a citizen of the United States, and resident of Easton, in the county of Northampton and State of Pennsylvania, have invented a new and useful Improvement in Percussive Tools, of which the following is a specification.

This invention has for its object to provide a percussive tool in which the springs for yieldingly holding the head block in position serve both as shock absorbers and as locking devices to prevent the displacement of the parts which secure the front head to the tool cylinder.

A further object is to provide a spring for use in connection with percussive tools, which spring will serve as a nut or bolt lock as well as a shock absorber.

Practical embodiments of this invention are represented in the accompanying drawings, in which, Figure 1 is a side elevation, partly in section, of the front portion of a hammer drill showing the shock absorbing springs interposed between the front head and the nuts of the bolts which secure the front head to the cylinder. Fig. 2 is a side view taken at right angles to Fig. 1. Fig. 3 is an inverted section taken in the plane of the line A—A of Fig. 1. Fig. 4 is a side view of one of the springs. Fig. 5 is an end view of the same. Fig. 6 is a side view of the nut. Fig. 7 is an end view of the same. Fig. 8 is a view similar to Fig. 2, with the bolt reversed and the shock absorbing spring interposed between the bolt head and the front head, and Fig. 9 is an inverted section taken in the plane of the line B—B of Fig. 8.

The tool cylinder is denoted by 1, the piston by 2, the anvil block by 3, the drill steel by 4, the front head by 5 and the bushing which holds the anvil block and which is interposed between the cylinder and front head, by 6. The bolts for securing the front head to the hammer cylinder, are denoted by 7, the heads of said bolts by 8, their screw-threaded ends by 9, and the nuts thereon by 10.

The springs which surround the bolts 7 are denoted by 11, and each spring comprises a plurality of coils. The outer end coil of the spring is provided with a projection 12, and the inner end coil of the spring is provided with a projection 13. The bolts 7 pass through flanges 14, 15, on the adjacent ends of the cylinder and front head. The outer face of the flange 15 on the front head is provided with a recess 16, for the reception of the projection 13 on the inner end coil of the spring 11.

In the form shown in Figs. 1 to 7 inclusive, the inner face of the nut 10 is provided with a recess 17 arranged to receive the projection 12 on the outer end coil of the spring 11. In this form the bolt is held from turning by the engagement of its head with the cylinder 1. The anvil block 2 projects into the piston chamber of the cylinder 1, sufficiently to prevent the piston 2 from striking the bushing 6 when the steel 4 is removed, the anvil block being arranged to be driven forwardly by the piston until it strikes the front head 5, so that the front head, the anvil block and the shock absorbing springs are the only parts which yield under the impact of the piston.

In assembling the parts, as the nut 10 is rotated on the screw-threaded portion 9 of the bolt 7, the projection 12 on the outer coil of the spring 11 will be alternately forced into and out of the recess 17 in the inner face of the nut. The engagement of the projection 13 on the inner end coil of the spring with the recess 16 in the flange 15 of the front head, will serve to prevent the spring from turning as the nut 10 is turned. The turning of this nut 10 will serve to accurately adjust the tension of the spring 11 and thereby the yielding resistance of the front head to the blows of the piston and anvil block. It will thus be seen that the springs 11 serve both as shock absorbers and as bolt and nut locks.

In the form shown in Figs. 8 and 9, the bolts 7 are reversed and the nuts 10* are held from turning by their engagement with the cylinder 1. In this form, the inner face of each of the heads 8* of the bolts 7, is provided with a recess 18 for receiving the projection 12 on the outer end coil of the spring 11. In assembling the parts, the bolts are turned in the nuts and when brought into the proper position they will be locked in such position by the engagement of the projections 12 in the recesses 18 and the projections 13 in the recesses 16.

What I claim is:

1. A percussive tool including a cylinder, its front head and their adjacent flanges, bolts passing through said flanges, nuts on said bolts beyond the front head flange, and coil springs interposed between said nuts and the front head flange, the inner and outer end coils of which springs have projections thereon, said front head flange and said nuts having recesses for receiving the projections on the inner and outer end coils of the springs, whereby the springs serve the double function of shock absorbers and nut locks.

2. A percussive tool including a cylinder, its front head and their adjacent flanges, bolts passing through said flanges, nuts on said bolts beyond the front head flange, and coil springs interposed between said nuts and the front head flange, the inner and outer end coils of which springs have projections thereon at a distance from the ends of the coils, said front head flange and said nuts having recesses for receiving the projections on the inner and outer end coils of the springs, whereby the springs serve the double function of shock absorbers and nut locks.

In testimony, that I claim the foregoing as my invention, I have signed my name in presence of two witnesses, this twenty-sixth day of March 1902.

LEWIS C. BAYLES.

Witnesses:
F. GEORGE BARRY,
HENRY C. THIEME.